(12) United States Patent
Yamamoto

(10) Patent No.: US 10,994,802 B2
(45) Date of Patent: May 4, 2021

(54) BICYCLE TRANSMISSION DEVICE

(71) Applicant: Shimano Inc., Osaka (JP)

(72) Inventor: Takashi Yamamoto, Osaka (JP)

(73) Assignee: Shimano Inc., Osaka (JP)

( * ) Notice: Subject to any disclaimer, the term of this patent is extended or adjusted under 35 U.S.C. 154(b) by 189 days.

(21) Appl. No.: 16/513,050

(22) Filed: Jul. 16, 2019

(65) Prior Publication Data

US 2019/0337586 A1 Nov. 7, 2019

Related U.S. Application Data

(63) Continuation of application No. 15/051,103, filed on Feb. 23, 2016, now Pat. No. 10,399,635.

(30) Foreign Application Priority Data

Mar. 25, 2015 (JP) .................................. 2015-063156

(51) Int. Cl.
| | |
|---|---|
| *B62M 6/55* | (2010.01) |
| *B62M 6/50* | (2010.01) |
| *B62M 11/06* | (2006.01) |
| *F16H 3/083* | (2006.01) |
| *B62M 11/02* | (2006.01) |

(52) U.S. Cl.
CPC ................ *B62M 6/50* (2013.01); *B62M 6/55* (2013.01); *B62M 11/06* (2013.01); *F16H 3/083* (2013.01); *B62M 11/02* (2013.01)

(58) Field of Classification Search
CPC ........... B62M 6/55; B62M 11/06; B62M 6/65
See application file for complete search history.

(56) References Cited

U.S. PATENT DOCUMENTS

| | | | | |
|---|---|---|---|---|
| 4,702,121 A | * | 10/1987 | Hartmann | .............. B62M 11/06 |
| | | | | 280/238 |
| 5,404,768 A | * | 4/1995 | Hwang | .................. B62M 11/06 |
| | | | | 74/369 |
| 6,196,347 B1 | * | 3/2001 | Chao | ........................ B62M 6/50 |
| | | | | 180/206.2 |

(Continued)

FOREIGN PATENT DOCUMENTS

| | | |
|---|---|---|
| DE | 102004045364 A1 | 3/2006 |
| DE | 10 2012 109 637 A1 | 4/2013 |

(Continued)

*Primary Examiner* — William Kellehar
*Assistant Examiner* — Gregory T Prather
(74) *Attorney, Agent, or Firm* — Global IP Counselors, LLP

(57) ABSTRACT

A bicycle transmission device basically includes an input rotational shaft, an output part, a transmission mechanism and a switching mechanism. The transmission mechanism includes a first rotating body configured to transmit rotation of the input rotational shaft and a fourth rotating body configured to transmit the rotation of the input rotational shaft. The switching mechanism is configured to selectively switch between a first state in which a ratio of a rotational speed of the output part to a rotational speed of the input rotational shaft is a first ratio and a second state in which the ratio is a second ratio that is different from the first ratio. The switching mechanism includes a one-way clutch and a switching unit.

15 Claims, 7 Drawing Sheets

(56) References Cited

U.S. PATENT DOCUMENTS

| | | | | |
|---|---|---|---|---|
| 6,296,072 B1* | 10/2001 | Turner | ............... | B62M 11/18 180/220 |
| 8,651,993 B1* | 2/2014 | Watarai | ............... | F16H 37/065 475/205 |
| 8,777,791 B1* | 7/2014 | Hino | ............... | B60W 20/40 475/5 |
| 9,969,461 B2* | 5/2018 | Huang | ............... | B62M 6/55 |
| 2007/0210552 A1* | 9/2007 | Nicolai | ............... | B62M 11/06 280/259 |
| 2011/0251008 A1* | 10/2011 | Schmitz | ............... | B62M 11/145 475/31 |
| 2013/0095971 A1* | 4/2013 | Hino | ............... | B62M 6/65 475/5 |
| 2014/0090500 A1* | 4/2014 | Schmitz | ............... | F16H 3/0915 74/335 |
| 2014/0138174 A1* | 5/2014 | Getta | ............... | B62M 6/55 180/220 |
| 2014/0235383 A1* | 8/2014 | Wesling | ............... | B62M 6/55 474/80 |
| 2015/0122565 A1* | 5/2015 | Deleval | ............... | B62M 6/50 180/206.3 |
| 2016/0159434 A1* | 6/2016 | Huang | ............... | B62M 6/45 701/67 |
| 2016/0280328 A1* | 9/2016 | Yamamoto | ............... | B62M 11/14 |
| 2017/0029065 A1* | 2/2017 | Hayslett | ............... | B62M 6/55 |
| 2017/0029068 A1* | 2/2017 | Hayslett | ............... | B62M 6/55 |
| 2017/0036737 A1* | 2/2017 | Mangini | ............... | B62M 11/06 |
| 2017/0152001 A1* | 6/2017 | Yamamoto | ............... | B62M 6/55 |
| 2017/0217537 A1* | 8/2017 | Yamamoto | ............... | B62M 11/145 |
| 2017/0217538 A1* | 8/2017 | Yamamoto | ............... | B62M 11/145 |
| 2017/0219066 A1* | 8/2017 | Yamamoto | ............... | B62M 6/55 |

FOREIGN PATENT DOCUMENTS

| | | |
|---|---|---|
| EP | 1445088 A2 | 8/2004 |
| EP | 3 153 393 A1 | 4/2017 |
| FR | 195941 A | 3/1936 |
| JP | 52-2745 U | 6/1975 |
| JP | 10-162091 A | 6/1998 |
| JP | 2000-318674 A | 11/2000 |
| JP | 4056130 B2 | 3/2008 |
| JP | 5523636 B1 | 6/2014 |
| WO | 2012066124 A1 | 5/2012 |
| WO | 2015/186159 A1 | 12/2015 |

* cited by examiner

BICYCLE TRANSMISSION DEVICE

CROSS-REFERENCE TO RELATED APPLICATIONS

This application is a continuation application of U.S. patent application Ser. No. 15/051,103, which was filed on Feb. 23, 2016. This application claims priority to Japanese Patent Application No. 2015-063156, filed on Mar. 25, 2015. The entire disclosures of Japanese Patent Application No. 2015-063156 and U.S. patent application Ser. No. 15/051,103 are hereby incorporated herein by reference.

BACKGROUND

Field of the Invention

This invention generally relates to a bicycle transmission device.

Background Information

Generally, a bicycle transmission device transmits a pedaling force of the rider or an output of a motor to rotate a wheel. One example of a bicycle transmission device is described in Japanese Patent No. 5,523,636. The bicycle transmission device of this patent has a transmission mechanism that can reduce the speed of the rotation input to the crankshaft and output this to the output part, as well as a switching mechanism for switching between a state in which the crankshaft and the output part are coupled and a state in which the coupling between the crankshaft and the output part is released. When the switching mechanism is in a state in which the crankshaft and the output part are released, the rotation that is input to the crankshaft is decelerated by the transmission mechanism and is output to the output part. When the switching mechanism is in a state in which the crankshaft and the output part are coupled, the rotation that is input to the crankshaft is output to the output part without being decelerated by the transmission mechanism. That is, the transmission mechanism is able to obtain two transmission ratios with the switching mechanism.

SUMMARY

Generally, the present disclosure is directed to various features of a bicycle transmission device.

A transmission mechanism of the transmission device described in the above mentioned patent decelerates the rotation of the crankshaft and outputs this rotation to the output part. For this reason, the torque of the output part is greater than the torque of the crankshaft. Then, as the torque that is applied to the switching mechanism increases, it becomes more difficult for the switching mechanism to release the connection between the crankshaft and the output part. For this reason, the transmission performance degrades.

One aspect presented in this disclosure is to provide a bicycle transmission device that is able to improve the transmission performance.

In view of the state of the known technology and in accordance with a first aspect of the present disclosure, a bicycle transmission device is provided that basically includes an input rotational shaft, an output part, a transmission mechanism and a switching mechanism. The transmission mechanism includes a first rotating body configured to transmit rotation of the input rotational shaft and a fourth rotating body configured to transmit the rotation of the input rotational shaft. The fourth rotating body is different from the first rotating body. The switching mechanism is configured to selectively switch between a first state in which a ratio of a rotational speed of the output part to a rotational speed of the input rotational shaft is a first ratio and a second state in which the ratio is a second ratio that is different from the first ratio. The switching mechanism includes a one-way clutch and a switching unit. The one-way clutch is configured to switch between a third state in which rotation is not transmitted from the first rotating body to the output part, and a fourth state in which rotation is transmitted from the first rotating body to the output unit. The switching unit is configured to switch between a fifth state in which rotation is transmitted from the fourth rotating body to the output part, and a sixth state in which rotation is not transmitted from the fourth rotating body to the output part. The first state includes the third state and the fifth state. The second state includes the fourth state and the sixth state.

Also other objects, features, aspects and advantages of the disclosed bicycle transmission device will become apparent to those skilled in the art from the following detailed description, which, taken in conjunction with the annexed drawings, discloses one illustrative embodiment of the bicycle transmission device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
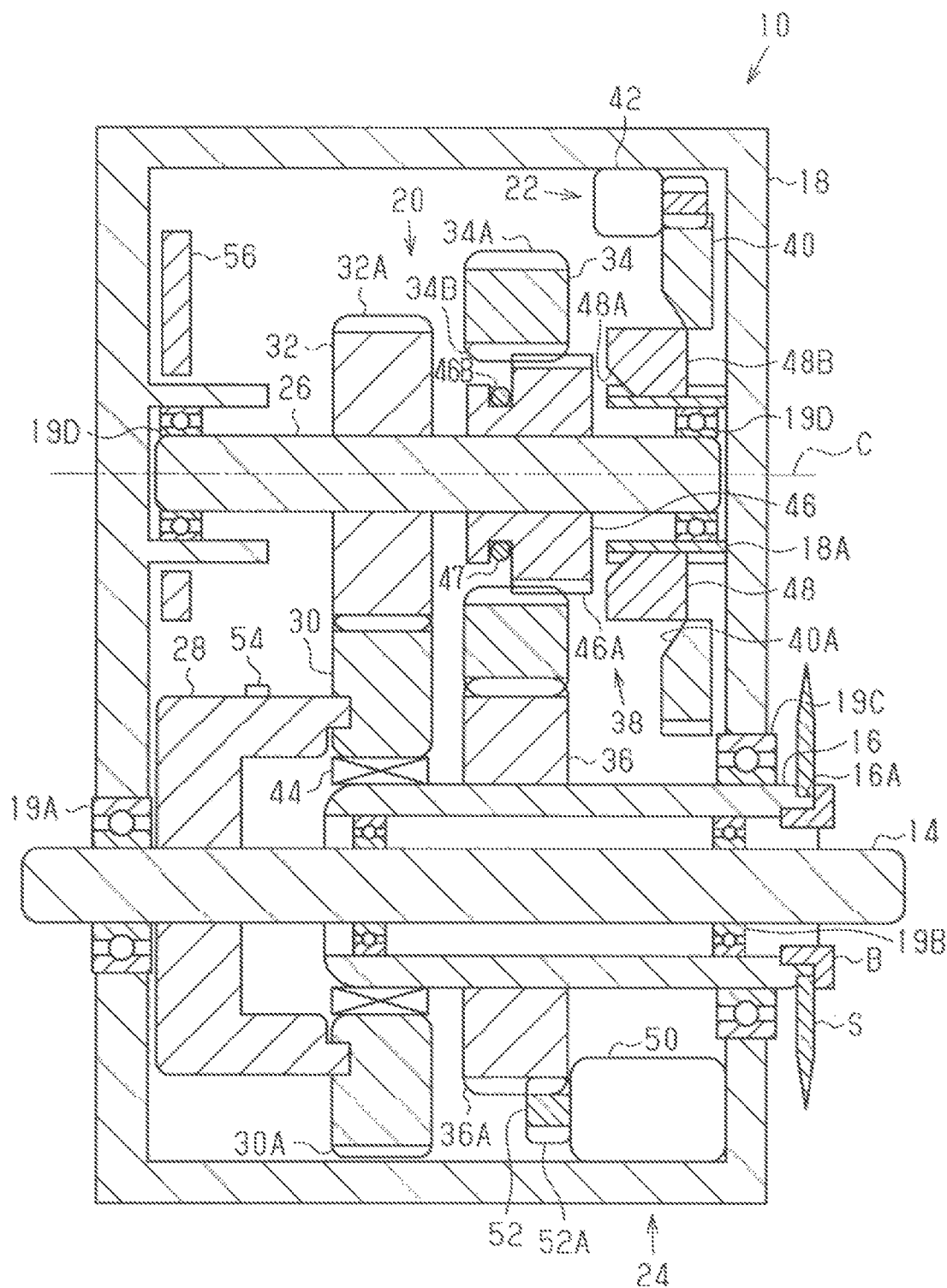
FIG. 1 is a cross-sectional view of a bicycle transmission device in accordance with a first embodiment with a switching mechanism of the bicycle transmission device in a first state.
Figure 2:
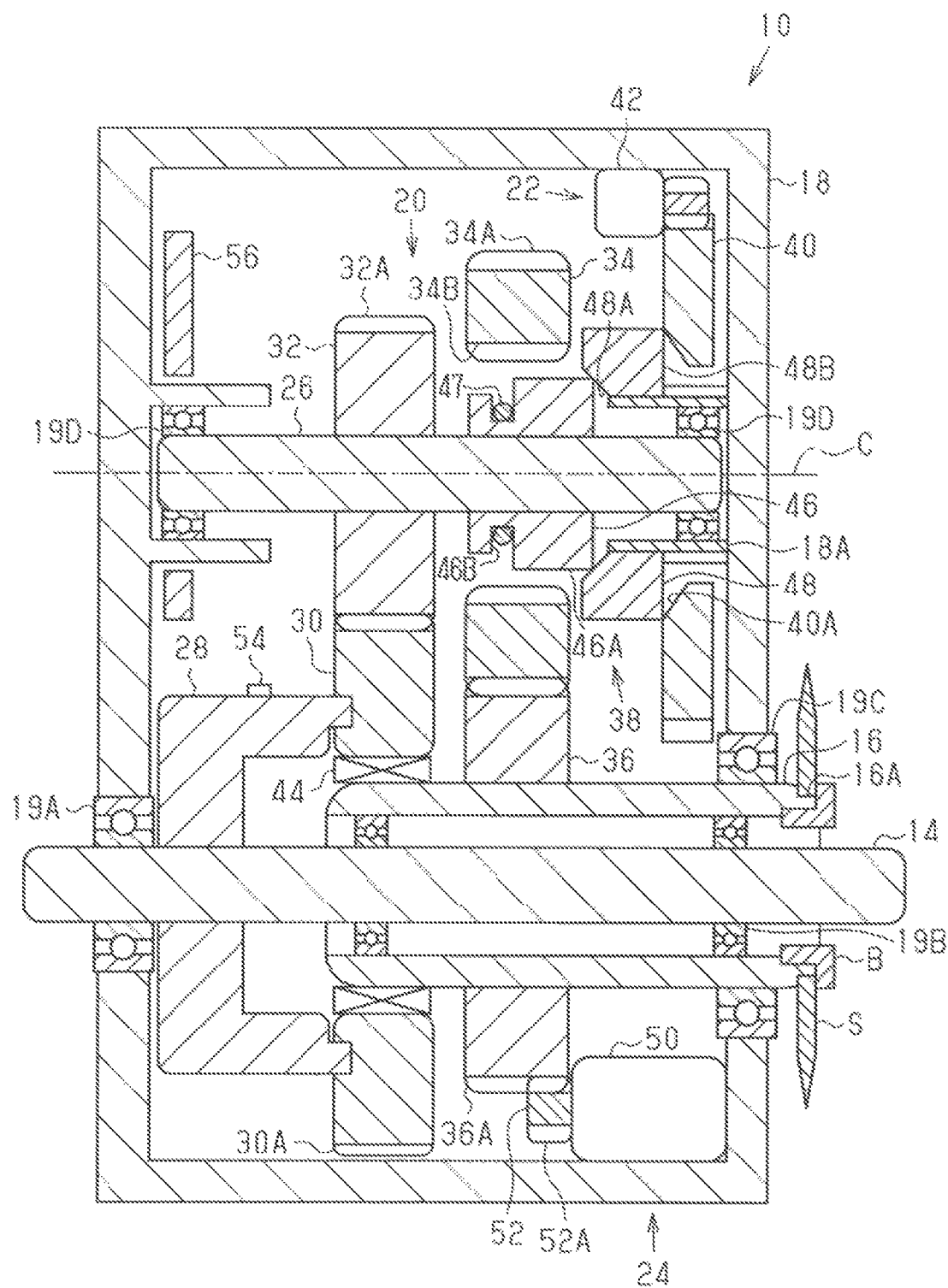
FIG. 2 is a cross-sectional view of the bicycle transmission device illustrated in FIG. 1 with the switching mechanism of the bicycle transmission device in a second state.

Referring initially to FIGS. 1 and 2, a bicycle transmission device 10 in accordance with a first embodiment will be described. As shown in FIG. 1, the transmission device 10 comprises an input rotational shaft 14, an output part 16, a housing 18, a transmission mechanism 20, a switching mechanism 22 and an assist mechanism 24. The input rotational shaft 14 is a crankshaft in the first embodiment. The output part 16 output the rotational input from the input rotational shaft 14. The transmission mechanism 20 is configured to output the rotational input that is inputted from the input rotational shaft 14 to the output part 16 based on an operative state of the switching mechanism 22.

The housing 18 is attached to a bicycle frame (not shown) in a conventional manner. The housing 18 houses a part of the input rotational shaft 14, a part of the output part 16, the transmission mechanism 20 and the switching mechanism 22.

The input rotational shaft 14 is rotatably supported by the housing 18. The two ends of the input rotational shaft 14 are exposed to the outside of the housing 18. A bicycle crank arm (not shown) can be attached to each end of the input rotational shaft 14, such that a manual drive force is inputted via the crank arms. The input rotational shaft 14 can be a hollow shaft. The housing 18 rotationally supports a first outer axial end part of the input rotational shaft 14 by a first bearing 19A. The output part 16 rotationally supports a second outer axial end part of the input rotational shaft 14 by a second bearing 19B.

The output part 16 has a tubular shape, i.e., a tubular shaft. The output part 16 is coaxially disposed around the input rotational shaft 14. The second bearing 19B is provided on an inner periphery section of the output part 16 in an axial space between the input rotational shaft 14 and the output part 16. In this way, the output part 16 rotatably supports the input rotational shaft 14 via the bearing 19B. One end of the output part 16 is exposed to the outside of the housing 18. The output part 16 has an outer axial end section with the end being exposed to the outside of the housing 18. This outer axial end section is supported by the housing 18 via a bearing 19C.

The outer axial end section of the output part 16 comprises an attaching portion 16A that is capable of attaching to an inner periphery of a sprocket S at one axial end of the input rotational shaft 14. The attaching portion 16A has a plurality of splines formed on the outer peripheral surface of the attaching portion 16A. The sprocket S is fitted to the splines on the outer axial end part of the attaching portion 16A. A female screw is formed in the inner peripheral surface of the attaching portion 16A. The sprocket S is attached to the output part 16 with a bolt B being screwed into the attaching portion 16A, sandwiching the sprocket S.

The transmission mechanism 20 comprises a transmission shaft 26, a transmission body 28, a first rotating body 30, a second rotating body 32, a third rotating body 34 and a fourth rotating body 36. The transmission shaft 26 is disposed radially outward of the input rotational shaft 14 with to a radial direction of the center axis of the input rotational shaft 14. The transmission shaft 26 is arranged parallel to the input rotational shaft 14. The transmission shaft 26 is rotatably supported by the housing 18. Both axial ends of the transmission shaft 26 are supported by the housing 18 via a pair of bearings 19D. The transmission shaft 26 is rotatable around a stationary center axis C whose position does not change with respect to the input rotational shaft 14.

The transmission body 28 has a tubular shaped portion. The transmission body 28 is disposed around the input rotational shaft 14. The transmission body 28 is coaxially with the input rotational shaft 14. The transmission body 28 is fixedly supported by the input rotational shaft 14 so as to be relatively non-rotatable via spline fitting, a press fitting, or the like. For this reason, the transmission body 28 integrally rotates with the input rotational shaft 14.

The first rotating body 30 has an annular ring shape. The first rotating body 30 is disposed on one axial end of the transmission body 28. That is, the transmission body 28 couples the input rotational shaft 14 and the first rotating body 30 together. The outer periphery of the first rotating body 30 has a plurality of gear teeth 30A.

The second rotating body 32 has an annular ring shape. The second rotating body 32 is coaxially disposed on the transmission shaft 26. The second rotating body 32 is fixedly supported on the transmission shaft 26 so as to be relatively non-rotatable via spline fitting, press fitting, or the like. For this reason, the second rotating body 32 integrally rotates with the transmission shaft 26 around the center axis C. The outer periphery of the second rotating body 32 has a plurality of gear teeth 32A. The gear teeth 32A of the second rotating body 32 meshes with the gear teeth 30A of the first rotating body 30. For this reason, the torque of the transmission body 28 is transmitted to the second rotating body 32 via the first rotating body 30. The number of teeth of the gear teeth 32A of the second rotating body 32 is less than the number of teeth of the gear teeth 30A of the first rotating body 30. For this reason, the rotation transmitted to the second rotating body 32 from the first rotating body 30 is accelerated.

The third rotating body 34 has an annular ring shape. The third rotating body 34 is coaxially disposed around the transmission shaft 26. The third rotating body 34 is supported by the transmission shaft 26 via the switching mechanism 22. The third rotating body 34 is rotatably supported by the transmission shaft 26. The third rotating body 34 integrally rotates with the second rotating body 32 and the transmission shaft 26 around the center axis C, when coupled to the transmission shaft 26 via the switching mechanism 22. The inner periphery of the third rotating body 34 has a plurality of grooves 34B for coupled to the switching mechanism 22. The grooves 34B are arranged in the circumferential direction at predetermined intervals. Each of the grooves 34B has the same shape that is in the form of a so-called ratchet groove. The outer periphery of the third rotating body 34 has a plurality of gear teeth 34A.

The fourth rotating body 36 has an annular ring shape. The fourth rotating body 36 is disposed around the output part 16 and is coaxially with the output part 16. The fourth rotating body 36 is fixedly coupled to the output part 16 via spline fitting, press fitting, or the like. For this reason, the fourth rotating body 36 integrally rotates with the output part 16. The outer periphery of the fourth rotating body 36 has a plurality of gear teeth 36A. The gear teeth 36A meshes with the gear teeth 34A of the third rotating body 34. For this reason, the torque of the third rotating body 34 is transmitted to the fourth rotating body 36. The number of teeth of the gear teeth 36A of the fourth rotating body 36 is less than the number of teeth of the gear teeth 34A of the third rotating body 34. For this reason, the rotation of the fourth rotating body 36 transmitted from the third rotating body 34 is decelerated at a predetermined speed reduction ratio to the fourth rotating body 36. The speed increase ratio between the first rotating body 30 and the second rotating body 32 is greater than the predetermined speed reduction ratio between the third rotating body 34 and the fourth rotating body 36. For this reason, when the rotation is transmitted from the first rotating body 30 to the fourth rotating body 36 via the second rotating body 32 and the third rotating body 34, the rotational speed of the fourth rotating body 36 is greater than the rotational speed of the first rotating body 30.

The switching mechanism 22 switches between a first state and a second state. In the first state, the output part 16 and the input rotational shaft 14 are coupled via the transmission mechanism 20. In the second state, the output part 16 and the input rotational shaft 14 are coupled without interposing the transmission mechanism 20. In other words, in the second state, the transmission mechanism 20 is in a disengaged state between the output part 16 and the input rotational shaft 14 so that the input rotational is not transmitted to the output part 16 via the fourth rotating body 36.

In the first state, the switching mechanism 22 permits torque to be transmitted between the input rotational shaft 14 and the first rotating body 30, between the first rotating body 30 and the second rotating body 32, between the second rotating body 32 and the third rotating body 34, between the third rotating body 34 and fourth rotating body 36, and between the fourth rotating body 36 and the output part 16. In the second state, the switching mechanism 22 does not permit torque to be transmitted between the second rotating body 32 and the third rotating body 34.

The switching mechanism 22 comprises a switching unit 38, a shift cam 40, an actuator 42 and a one-way clutch 44. The switching unit 38 is disposed between the transmission shaft 26 and the inner periphery of the third rotating body 34. The shift cam 40 operates the switching unit 38. The actuator 42 operates the shift cam 40. The one-way clutch 44 is disposed between the inner periphery of the transmission body 28 and the outer periphery of the output part 16. The actuator 42 is, for example, an electric motor.

The switching unit 38 comprises a coupling member 46, an elastic member 47 and a control member 48. The coupling member 46 has at least a part of which that is disposed between the outer periphery of the transmission shaft 26 and the inner periphery of the third rotating body 34.

The coupling member 46 is provided on the outer periphery of the transmission shaft 26. The coupling member 46 can couple the transmission shaft 26 and the third rotating body 34. The coupling member 46 comprises a plurality of pawls 46A protruding from the transmission shaft 26 toward the inner periphery of the third rotating body 34. The inner peripheral parts of the pawls 46A are supported by the transmission shaft 26 and are coupled to the transmission shaft 26.

The elastic member 47 is, for example, a ring-shaped spring. The elastic member 47 is fitted in the groove 46B that is formed on the outer surfaces of a plurality of coupling members 46. The elastic member 47 applies a force to the pawls 46A, in a direction that projects toward the inner periphery of the third rotating body 34.

The control member 48 has an annular ring shape. The control member 48 is coaxially disposed around the transmission shaft 26. The control member 48 can be moved in the axial direction along the transmission shaft 26. The control member 48 is non-rotatably disposed around the transmission shaft 26. The control member 48 is supported by a support portion 18A that is connected to the housing 18 so that the inner peripheral part can move in the axial direction of the transmission shaft 26. The control member 48 comprises a tapered surface 48A and a contact portion 48B that comes in contact with a cam surface 40A of the shift cam 40. The tapered surface 48A is formed on a side of the transmission shaft 26 that opposes the pawls 46A with respect to the axial direction. The contact portion 48B of the control member 48 is formed on the opposite side of the tapered surface 48A with respect to the axial direction of the transmission shaft 26. A biasing member, which is not illustrated, is attached to the control member 48. The biasing member applies a force to the control member 48 to separate it from the coupling member 46. The biasing member is, for example, a spring.

The shift cam 40 is disposed in a position that opposes the contact portion 48B. The shift cam 40 is provided with a cam surface 40A. The shift cam 40 is coupled to the actuator 42. With the rotation in one direction of the electric motor, which is the actuator 42, the cam surface 40A of the shift cam 40 moves the control member 48 in a direction that approaches the pawls 46A along the axial direction of the transmission shaft 26. With the rotation in the other direction of the electric motor, which is the actuator 42, movement of the control member 48 in a direction in which the shift cam 40 moves away from the control member 48 along the axial direction of the transmission shaft 26 is permitted, and the biasing member (not shown) moves the control member 48 in a direction away from the pawls 46A.

The one-way clutch 44 is a roller clutch. The one-way clutch 44 integrally rotates the input rotational shaft 14 and the output part 16 when the rotational speed of the input rotational shaft 14 in one direction is equal to or greater than the rotational speed of the output part 16 in one direction. The one-way clutch 44 permits a relative rotation between the input rotational shaft 14 and the output part 16 when the rotational speed of the input rotational shaft 14 in one direction is less than the rotational speed of the output part 16 in one direction. The rotation in one direction corresponds to the rotational direction of the input rotational shaft 14 when the bicycle (not shown) moves forward.

When the control member 48 moves to the laterally away from the coupling member 46 in the axial direction of the transmission shaft 26 to a position spaced away from the coupling member 46, the pawls 46A protrudes toward the grooves 34B of the third rotating body 34 as seen in FIG. 1. In other words, when the transmission mechanism 20 is in the first state, the tapered surface 48A separates from the pawls 46A, and the pawls 46A protrudes toward the grooves 34B of the third rotating body 34. As a result, the pawls 46A are fitted in the grooves 34B. For this reason, the third rotating body 34 becomes relatively non-rotatable with respect to the transmission shaft 26 and the second rotating body 32. As a result, the torque of the transmission shaft 26 and the second rotating body 32 is transmitted to the third rotating body 34.

The number of teeth of the gear teeth 36A of the fourth rotating body 36 is less than the number of teeth of the gear teeth 30A of the first rotating body 30. For this reason, when the switching mechanism 22 is in the first state shown in FIG. 1, the rotation that is input to the transmission mechanism 20 is accelerated, and the accelerated rotation is outputted to the output part 16. When the switching mechanism 22 is in the first state, the rotational speed of the input rotational shaft 14 and the first rotating body 30 is less than the rotational speed of the output part 16. For this reason, the one-way clutch 44 permits the relative rotation between the input rotational shaft 14 and the first rotating body 30, as well as the output part 16. As a result, the rotation of the input rotational shaft 14 is accelerated by the transmission mechanism 20, and the accelerated rotation is output to the output part 16.

As shown in FIG. 2, when the control member 48 moves towards the coupling member 46 in the axial direction of the transmission shaft 26 to in a position that is in contact with the coupling member 46, the tapered surface 48A pushes the pawls 46A down. In other words, when the transmission mechanism 20 is in the second state, the tapered surface 48A pushes the pawls 46A down. As a result, the pawls 46A separate from the grooves 34B. That is, the control member 48 detaches the coupling member 46 from the third rotating body 34. For this reason, the third rotating body 34 becomes relatively rotatable with respect to the transmission shaft 26 and the second rotating body 32. As a result, the torque of the transmission shaft 26 and the second rotating body 32 is not transmitted to the third rotating body 34.

When the switching mechanism 22 is in the second state shown in FIG. 2, torque is not transmitted from the second rotating body 32 to the third rotating body 34. For this reason, when the switching mechanism 22 is in the second state, the rotational speed of the input rotational shaft 14 and the first rotating body 30 is equal to or greater than the rotational speed of the output part 16. For this reason, the one-way clutch 44 integrally rotates the input rotational shaft 14 and the first rotating body 30, as well as the output part 16. As a result, the rotation of the input rotational shaft 14 is output to the output part 16 without being accelerated by the transmission mechanism 20.

The assist mechanism 24 comprises an assist motor 50. The outer periphery of the output shaft 52 of the assist motor 50 has a plurality of gear teeth 52A. The gear teeth 52A meshes with the gear teeth 36A of the fourth rotating body 36, in a position that is different from the gear teeth 34A of the third rotating body 34. That is, the assist motor 50 is coupled to the output part 16 via the fourth rotating body 36.

A torque sensor 54 is attached to the transmission body 28. The torque sensor 54 outputs a signal, which corresponds to the torque that is applied to the transmission body 28, to the control device 56. The control device 56 controls the assist motor 50 based on the output of the torque sensor 54. The torque sensor 54 is realized by, for example, a strain sensor. The signal of the strain sensor is wirelessly transmitted to the control device 56. The control device 56 controls the actuator 42. The control device 56 is connected to a shift operating unit, which is not shown, and drives the actuator 42 based on the signal from the shift operating unit. The shift operating unit is realized by a shift switch and a shift lever, which are provided to the handle of the bicycle. The shift operating unit can be connected to the control device 56 via electrical wiring or connected to the control device 56 wirelessly. The control device 56 can drive the actuator 42 based on, for example, a detection signal from a sensor that is provided to the bicycle. Examples of the sensor include a speed sensor for detecting the speed of the bicycle and a cadence sensor for detecting the cadence of the crank. With the control device 56 driving the actuator 42, the transmission device 10 functions as a two-step transmission device.

The operation of the transmission device 10 will be described. The coupling member 46 is disposed between the third rotating body 34 and the transmission shaft 26 after the rotation of the input rotational shaft 14 has been accelerated. That is, the amount of torque that is applied to the coupling member 46 is less than the amount of torque that is applied to the input rotational shaft 14. For this reason, when the transmission mechanism 20 is in the first state and the pawls 46A of the coupling member 46 is fitted in the grooves 34B of the third rotating body 34, the force required for the pawls 46A to be pulled out of the grooves 34B can be reduced.

The transmission device 10 attains the following effects.

(1) The switching mechanism 22 switches the transmission of the torque between the third rotating body 34 and the transmission shaft 26, which has a higher rotational speed and less torque than the input rotational shaft 14. For this reason, the transmission performance can be improved, as compared to when switching the transmission of the torque between members after the rotation of the input rotational shaft 14 has been decelerated.

(2) The switching mechanism 22 comprises a one-way clutch 44. For this reason, for example, the configuration of the transmission device 10 can be simplified, as compared to when, for example, providing an electric clutch and controlling the transmission of the torque between the output part 16 and the input rotational shaft 14 or the first rotating body 30.

(3) The assist motor 50 transmits torque to the fourth rotating body 36. For this reason, the torque that is applied to the coupling member 46 can be reduced, as compared to when transmitting the torque of the assist motor 50 upstream from the fourth rotating body 36, in the power transmission path from the input rotational shaft 14 to the output part 16. For this reason, the transmission performance being degraded due to torque from the assist motor 50 can be suppressed.

Second Embodiment

Figure 3:
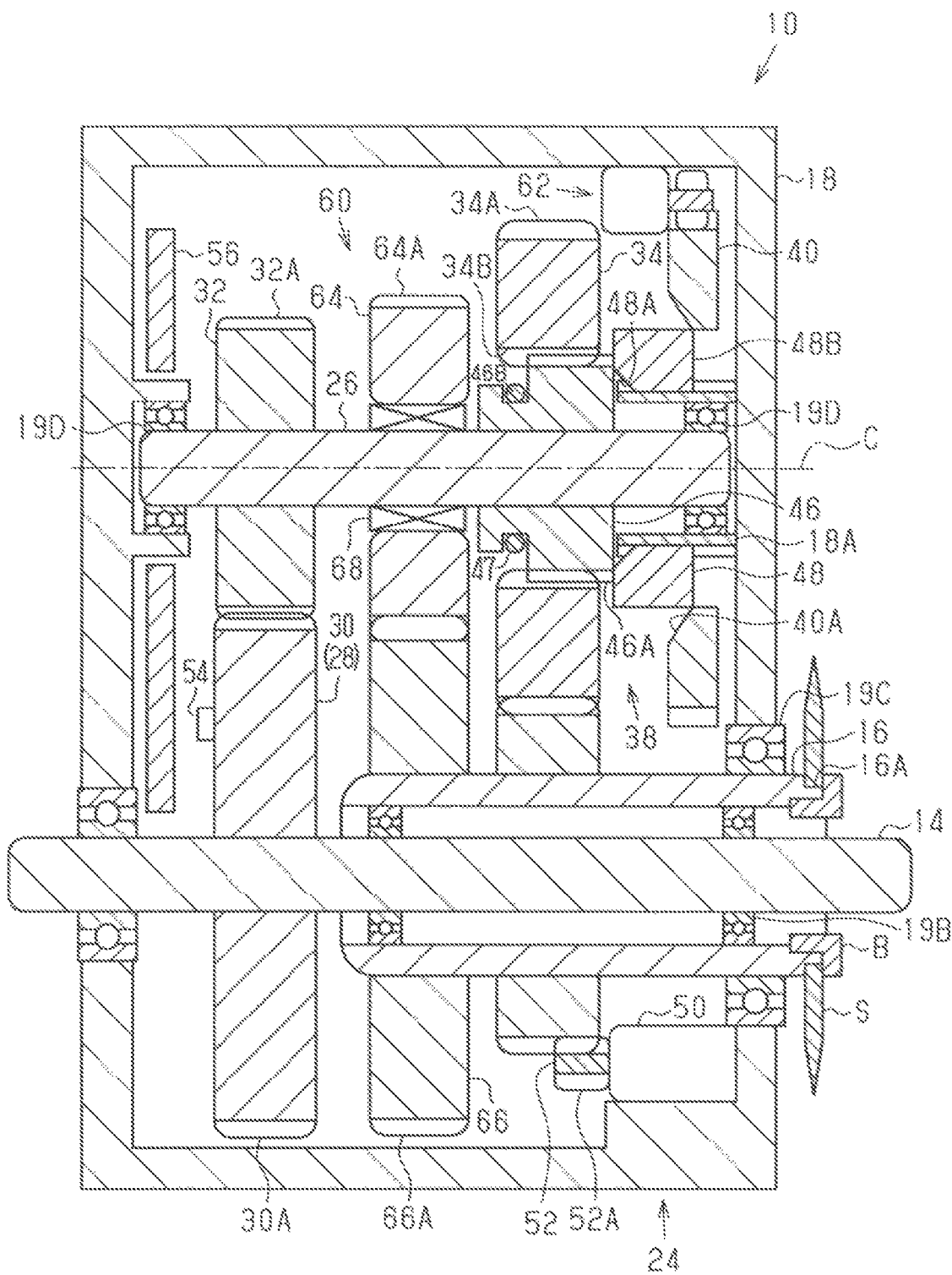
FIG. 3 is a cross-sectional view of a bicycle transmission device in accordance with a second embodiment.

A bicycle transmission device 10 in accordance with a second embodiment will be described with reference to FIG. 3. The configurations that are the same as those in the first embodiment are given the same reference numerals, and the descriptions thereof have been omitted.

The transmission device 10 comprises the input rotational shaft 14, the output part 16, the housing 18, a transmission mechanism 60 that can output the rotation that is input from the input rotational shaft 14 to the output part 16, and a switching mechanism 62.

The transmission mechanism 60 comprises the transmission shaft 26, a transmission body 28, the first rotating body 30, the second rotating body 32, the third rotating body 34, the fourth rotating body 36, a fifth rotating body 64, and a sixth rotating body 66. The transmission body 28 and the first rotating body 30 are integrated.

The fifth rotating body 64 is coaxially disposed around the transmission shaft 26. The fifth rotating body 64 is supported by the transmission shaft 26 via a one-way clutch 68 of the switching mechanism 62. For this reason, the fifth rotating body 64 integrally rotates with the transmission shaft 26 around the center axis C, when the transmission shaft 26 is rotated in a predetermined direction. The outer periphery of the fifth rotating body 64 has a plurality of gear teeth 64A.

The sixth rotating body 66 has a cylindrical shape. The sixth rotating body 66 is disposed around the output part 16 coaxially with the output part 16. The sixth rotating body 66 is coupled to the output part 16 via spline fitting, press fitting, or the like. For this reason, the sixth rotating body 66 integrally rotates with the output part 16. The outer periphery of the sixth rotating body 66 has a plurality of gear teeth 66A. The gear teeth 66A meshes with the gear teeth 64A of the fifth rotating body 64. For this reason, the torque of the fifth rotating body 64 is transmitted to the sixth rotating body 66. The number of teeth of the gear teeth 66A of the sixth rotating body 66 is less than the number of teeth of the gear teeth 64A of the fifth rotating body 64. For this reason, the rotation of the sixth rotating body 66 is decelerated due to the rotation transmitted by the fifth rotating body 64 to the sixth rotating body 66. The speed reduction ratio between the fifth rotating body 64 and the sixth rotating body 66 is different from the predetermined speed reduction ratio between the third rotating body 34 and the fourth rotating body 36. The speed reduction ratio between the fifth rotating body 64 and the sixth rotating body 66 is smaller than the predetermined speed reduction ratio between the third rotating body 34 and the fourth rotating body 36. The speed increase ratio between the first rotating body 30 and the second rotating body 32 is smaller than the predetermined speed reduction ratio between the fifth rotating body 64 and the sixth rotating body 66. For this reason, when the rotation is transmitted from the first rotating body 30 to the sixth rotating body 66 via the second rotating body 32 and the fifth rotating body 64, the rotational speed of the sixth rotating body 66 is slower than that of the first rotating body 34.

The switching mechanism 62 switches between a first state and a second state via the transmission mechanism 60. In the first state, the switching mechanism 62 permits torque to be transmitted between the input rotational shaft 14 and the first rotating body 30, between the first rotating body 30 and the second rotating body 32, between the second rotating body 32 and the third rotating body 34, between the third rotating body 34 and fourth rotating body 36, and between the fourth rotating body 36 and the output part 16. However, torque is not permitted to be transmitted between the second rotating body 32 and the fifth rotating body 64. In the second state, the switching mechanism 62 permits torque to be transmitted between the input rotational shaft 14 and the first rotating body 30, between the first rotating body 30 and the second rotating body 32, between the second rotating body 32 and the fifth rotating body 64, between the fifth rotating body 64 and the sixth rotating body 66, and between the sixth rotating body 66 and the output part 16; however, torque is not permitted to be transmitted between the second rotating body 32 and the third rotating body 34.

The switching mechanism 62 comprises a switching unit 38, an actuator 42, and a one-way clutch 68 that is disposed between the inner periphery of the transmission body 28 and the outer periphery of the output part 16.

The one-way clutch 68 is a roller clutch. The one-way clutch 68 integrally rotates the transmission shaft 26 and the fifth rotating body 64 when the rotational speed of transmission shaft 26 and the second rotating body 32 in one direction is equal to or greater than the rotational speed of the fifth rotating body 64 in one direction. The one-way clutch 68 permits the relative rotation of the transmission shaft 26 and the fifth rotating body 64 when the rotational speed of transmission shaft 26 and the second rotating body 32 in one direction is less than the rotational speed of the fifth rotating body 64 in one direction. The rotation in one direction corresponds to the rotational direction of the transmission shaft 26 and the second rotating body 32 when the bicycle (not shown) moves forward.

When the transmission mechanism 60 is in the first state, the pawls 46A are fitted in the grooves 34B, and the torque of the transmission shaft 26 and the second rotating body 32 is transmitted to the third rotating body 34. The rotation that is transmitted to the third rotating body 34 is output to the output part 16 via the fourth rotating body 36. When the switching mechanism 62 is in the first state, the rotational speed of the transmission shaft 26 and the second rotating body 32 is less than the rotational speed of the fifth rotating body 64, which is input to the fifth rotating body 64 from the output part 16 via the sixth rotating body 66. For this reason, the one-way clutch 68 permits the relative rotation between the transmission shaft 26 and the fifth rotating body 64. As a result, the rotation of the input rotational shaft 14 is shifted according to the transmission ratio between the first rotating body 30 and the second rotating body 32, as well as the transmission ratio between the third rotating body 34 and the fourth rotating body 36, and is output to the output part 16.

When the transmission mechanism 60 is in the second state, the pawls 46A are separated from the grooves 34B, so that the torque of the transmission shaft 26 and the second rotating body 32 is not transmitted to the third rotating body 34. For this reason, when the switching mechanism 62 is in the second state, the rotational speed of the transmission shaft 26 and the second rotating body 32 is equal to or greater than the rotational speed of the fifth rotating body 64, which is input to the fifth rotating body 64. As a result, the one-way clutch 68 integrally rotates the transmission shaft 26 and the fifth rotating body 64. For this reason, the rotation of the input rotational shaft 14 is shifted according to the transmission ratio between the first rotating body 30 and the second rotating body 32, as well as the transmission ratio between the fifth rotating body 64 and the sixth rotating body 66, and is output to the output part 16. According to the transmission device 10 of the present embodiment, effects pursuant to the effects of the first embodiment can be achieved.

Third Embodiment

Figure 4:
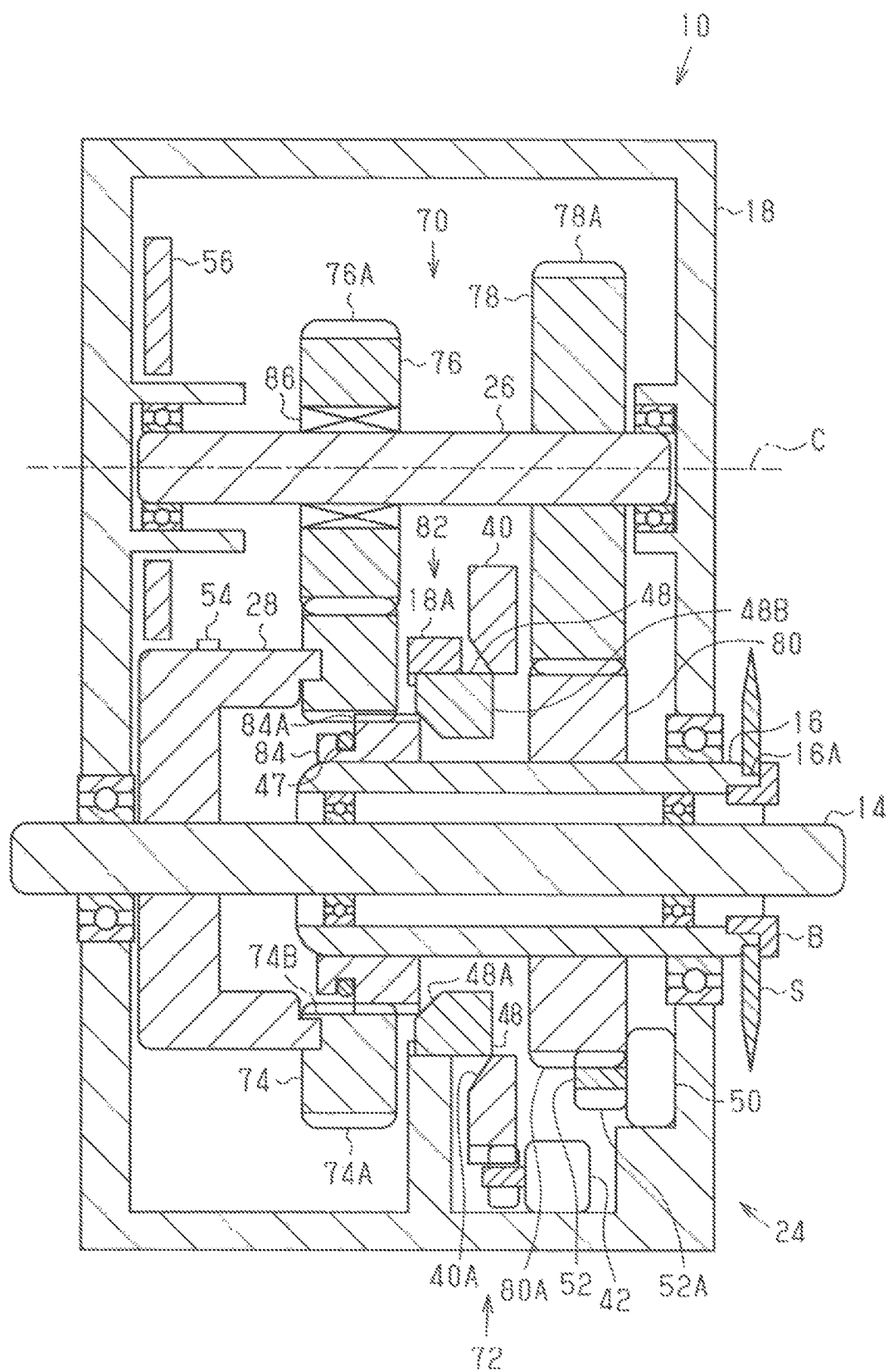
FIG. 4 is a cross-sectional view is a cross-sectional view of a bicycle transmission device in accordance with a third embodiment.

A bicycle transmission device 10 in accordance with a third embodiment will be described with reference to FIG. 4. The configurations that are the same as those in the first embodiment are given the same reference numerals, and the descriptions thereof have been omitted.

The transmission device 10 comprises the input rotational shaft 14, the output part 16, the housing 18, a transmission mechanism 70 that can output the rotation that is input from the input rotational shaft 14 to the output part 16, and a switching mechanism 72.

The transmission mechanism 70 comprises the transmission shaft 26, the transmission body 28, a first rotating body 74, a second rotating body 76, a third rotating body 78, and a fourth rotating body 80.

The first rotating body 74 comprises an annular ring shape, and one axial end is fitted to the transmission body 28. That is, the transmission body 28 couples the input rotational shaft 14 and the first rotating body 74. The outer periphery of the first rotating body 74 has a plurality of gear teeth 74A.

The second rotating body 76 is coaxially disposed around the transmission shaft 26. The second rotating body 76 is supported by the transmission shaft 26 via a one-way clutch 86 of the switching mechanism 72. For this reason, the second rotating body 76 integrally rotates with the transmission shaft 26 around the center axis C. The outer periphery of the second rotating body 76 has a plurality of gear teeth 76A. The gear teeth 76A meshes with the gear teeth 74A of the first rotating body 74. For this reason, the torque of the first rotating body 74 is transmitted to the second rotating body 76 via the transmission body 28. The number of teeth of the gear teeth 76A of the second rotating body 76 is less than the number of teeth of the gear teeth 74A of the first rotating body 74. For this reason, the rotation of the first rotating body 74 is accelerated and is transmitted to the second rotating body 76.

The third rotating body 78 is coaxially disposed around the transmission shaft 26. The third rotating body 78 is supported by the transmission shaft 26 so as to be relatively non-rotatable via spline fitting, press fitting, or the like. For this reason, the third rotating body 78 integrally rotates with the transmission shaft 26 around the center axis C. The outer periphery of the third rotating body 78 has a plurality of gear teeth 78A.

The fourth rotating body 80 has an annular ring shape. The fourth rotating body 80 is coaxially disposed around the output part 16. The fourth rotating body 80 is fixedly coupled to the output part 16 via spline fitting, press fitting, or the like. For this reason, the fourth rotating body 80 integrally rotates with the output part 16. The outer periphery of the fourth rotating body 80 has a plurality of gear teeth 80A. The gear teeth 80A meshes with the gear teeth 78A of the third rotating body 78. For this reason, the torque of the third rotating body 78 is transmitted to the fourth rotating body 80. The number of teeth of the gear teeth 80A of the fourth rotating body 80 is less than the number of teeth of the gear teeth 78A of the third rotating body 78. For this reason, the rotation of the fourth rotating body 80 is decelerated and is transmitted to the fourth rotating body 80. The speed increase ratio between the first rotating body 74 and the second rotating body 76 is smaller than the predetermined speed reduction ratio between the third rotating body 78 and the fourth rotating body 80. For this reason, when the rotation is transmitted from the first rotating body 74 to the fourth rotating body 80 via the second rotating body 76 and the third rotating body 78, the rotational speed of the fourth rotating body 80 is slower than the first rotating body 74.

The switching mechanism 72 switches between a first state, in which the output part 16 and the input rotational shaft 14 are coupled via the transmission mechanism 70, and a second state, in which the output part 16 and the input rotational shaft 14 are coupled without interposing the transmission mechanism 70.

The switching mechanism 72 permits torque to be transmitted between the input rotational shaft 14 and the first rotating body 74, between the first rotating body 74 and the second rotating body 76, between the second rotating body 76 and the third rotating body 78, between the third rotating body 78 and fourth rotating body 80, and between the fourth rotating body 80 and the output part 16, in the first state. The switching mechanism 72 does not permit torque to be transmitted between the second rotating body 76 and the third rotating body 78 in the second state.

The switching mechanism 72 comprises a switching unit 82 that is disposed between the transmission shaft 26 and the inner periphery of the third rotating body 78, the actuator 42 that operates the switching unit 82, and a one-way clutch 86 that is disposed between the inner periphery of the second rotating body 76 and the outer periphery of the transmission shaft 26.

The switching unit 82 comprises a coupling member 84, at least a part of which is disposed between the outer periphery of the output part 16 and the inner periphery of the first rotating body 74, the control member 48 and the shift cam 40.

The coupling member 84 is provided on the outer periphery of the output part 16. The coupling member 84 can couple the output part 16 and the first rotating body 74. The coupling member 84 comprises a plurality of pawls 84A that can protrude from the output part 16 toward the inner periphery of the first rotating body 74.

The one-way clutch 86 is a roller clutch. The one-way clutch 86 integrally rotates the second rotating body 76 and the transmission shaft 26 when the rotational speed of the input rotational shaft 14 in one direction is equal to or less than the rotational speed of the output part 16 in one direction. The one-way clutch 86 permits a relative rotation between the input rotational shaft 14 and the output part 16 when the rotational speed of the input rotational shaft 14 in one direction is greater than the rotational speed of the output part 16 in one direction. The rotation in one direction corresponds to the rotational direction of the input rotational shaft 14 when the bicycle (not shown) moves forward.

When the control member 48 moves to the side approaching the coupling member 84 in the axial direction of the output part 16 and in a position that is in contact with the coupling member 84, that is, when the transmission mechanism 20 is in the first state, the tapered surface 48A pushes the pawls 84A down. The pawls 84A are thereby separated from the grooves 74B that is formed on the inner periphery of the first rotating body 74. That is, the control member 48 detaches the coupling member 84 from the first rotating body 74. For this reason, the first rotating body 74 becomes relatively rotatable with respect to the output part 16. As a result, the torque of the first rotating body 74 is transmitted to the output part 16.

At this time, the torque of the first rotating body 74 is transmitted to the second rotating body 76 and rotates the second rotating body 76. Also at this time, the rotational speed of the third rotating body 78 is equal to or less than the rotational speed of the second rotating body 76; as a result, the second rotating body 76 integrally rotates the third rotating body 78 via the one-way clutch 86 and the transmission shaft 26. The torque of the third rotating body 78 is transmitted to the output part 16 via the fourth rotating body 80. For this reason, the rotation of the input rotational shaft 14 is decelerated by the transmission mechanism 70 and is output to the output part 16.

When the control member 48 moves axially away from the coupling member 84 in the axial direction of the output part 16 to in a position away from the coupling member 84, the pawls 84A protrude toward the grooves 74B that are formed on the inner periphery of the first rotating body 74. In other words, when the transmission mechanism 70 is in the second state, the tapered surface 48A separates from the pawls 84A, and the pawls 84A protrude toward the grooves 74B that are formed on the inner periphery of the first rotating body 74. As a result, the pawls 46A are fitted in the grooves 74B. For this reason, the first rotating body 74 becomes relatively non-rotatable with respect to the output part 16. As a result, the torque of the first rotating body 74 is transmitted to the output part 16.

At this time, the torque of the output part 16 is transmitted to the third rotating body 78 via the fourth rotating body 80. The number of teeth of the gear teeth 78A of the third rotating body 78 is greater than the number of teeth of the gear teeth 80A of the fourth rotating body 80. For this reason, the rotational speeds of the input rotational shaft 14, the output part 16, and the first rotating body 74 are less than the rotational speeds of the third rotating body 78 and the transmission shaft 26. As a result, the second rotating body 76 can relatively rotate with respect to the transmission shaft 26 via the one-way clutch 86. For this reason, the rotation of the second rotating body 76 is not transmitted to the transmission shaft 26. Consequently, the rotation of the input rotational shaft 14 is output to the output part 16 without being decelerated by the transmission mechanism 70.

Modifications

The specific form that the bicycle transmission device can take is not limited to the forms described in the above-described embodiments. The bicycle transmission device can take various forms different from the above-described embodiments. A modification of the above-described embodiments discussed below is one example of the various forms that the bicycle transmission device can take.

Figure 5:
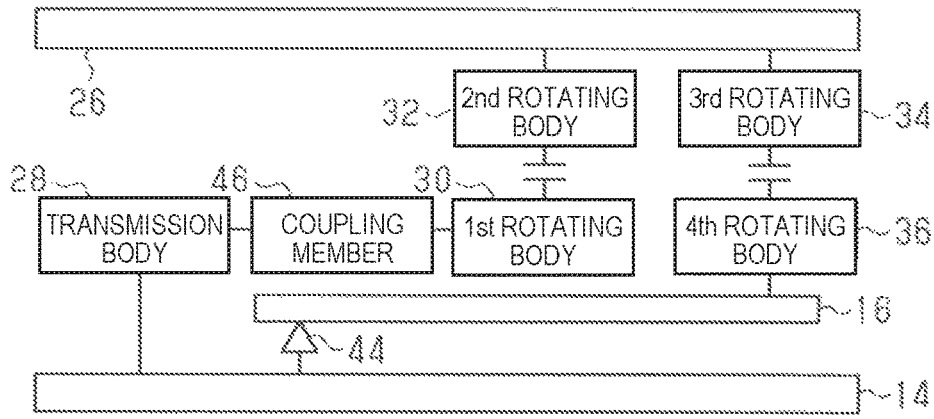
FIG. 5 is a schematic diagram of the transmission device in accordance with a first modification of the first embodiment.

The coupling member 46 of the first embodiment can be disposed between the transmission body 28 and the first rotating body 30, as shown in FIG. 5. In this case, the one-way clutch 44 is disposed between the input rotational shaft 14 and the output part 16. Furthermore, the third rotating body 34 is non-rotatably supported by the transmission shaft 26 via spline fitting, press fitting, or the like. The coupling member 46 can also be disposed between the input rotational shaft 14 and the transmission body 28. In this case as well, the transmission performance of the transmission device 10 can be improved, as compared to when disposing the coupling member 46 after the rotation that is input to the input rotational shaft 14 is decelerated to be slower than the rotation of the input rotational shaft 14.

Figure 6:
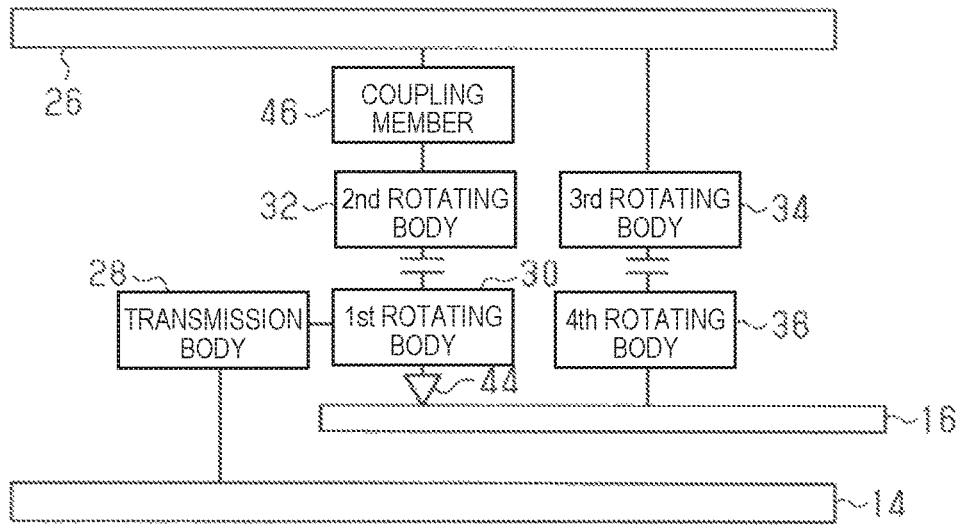
FIG. 6 is a schematic diagram of the transmission device in accordance with a second modification of the first embodiment.

The coupling member 46 of the first embodiment can be disposed between the second rotating body 32 and the transmission shaft 26, as shown in FIG. 6. In this case, the third rotating body 34 is non-rotatably supported by the transmission shaft 26 via spline fitting, press fitting, or the like.

Figure 7:
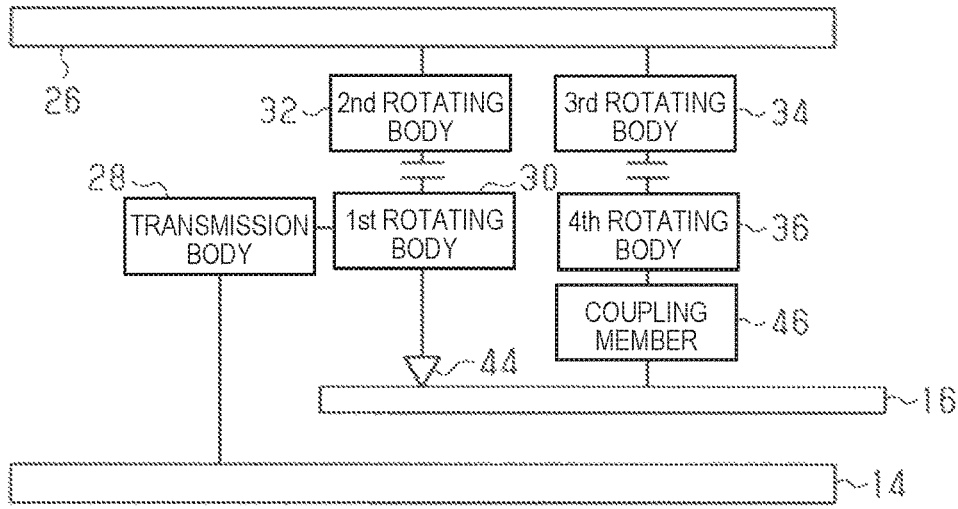
FIG. 7 is a schematic diagram of the transmission device in accordance with a third modification of the first embodiment.

The coupling member 46 of the first embodiment can be disposed between the fourth rotating body 36 and the output part 16, as shown in FIG. 7. In this case, the third rotating body 34 is non-rotatably supported by the transmission shaft 26 via spline fitting, press fitting, or the like.

The coupling member 46 of the first embodiment can be provided on the inner periphery of the third rotating body 34. In this case, the outer periphery of the transmission shaft 26 has grooves to which the pawls 46A of the coupling member 46 are fitted.

Figure 8:
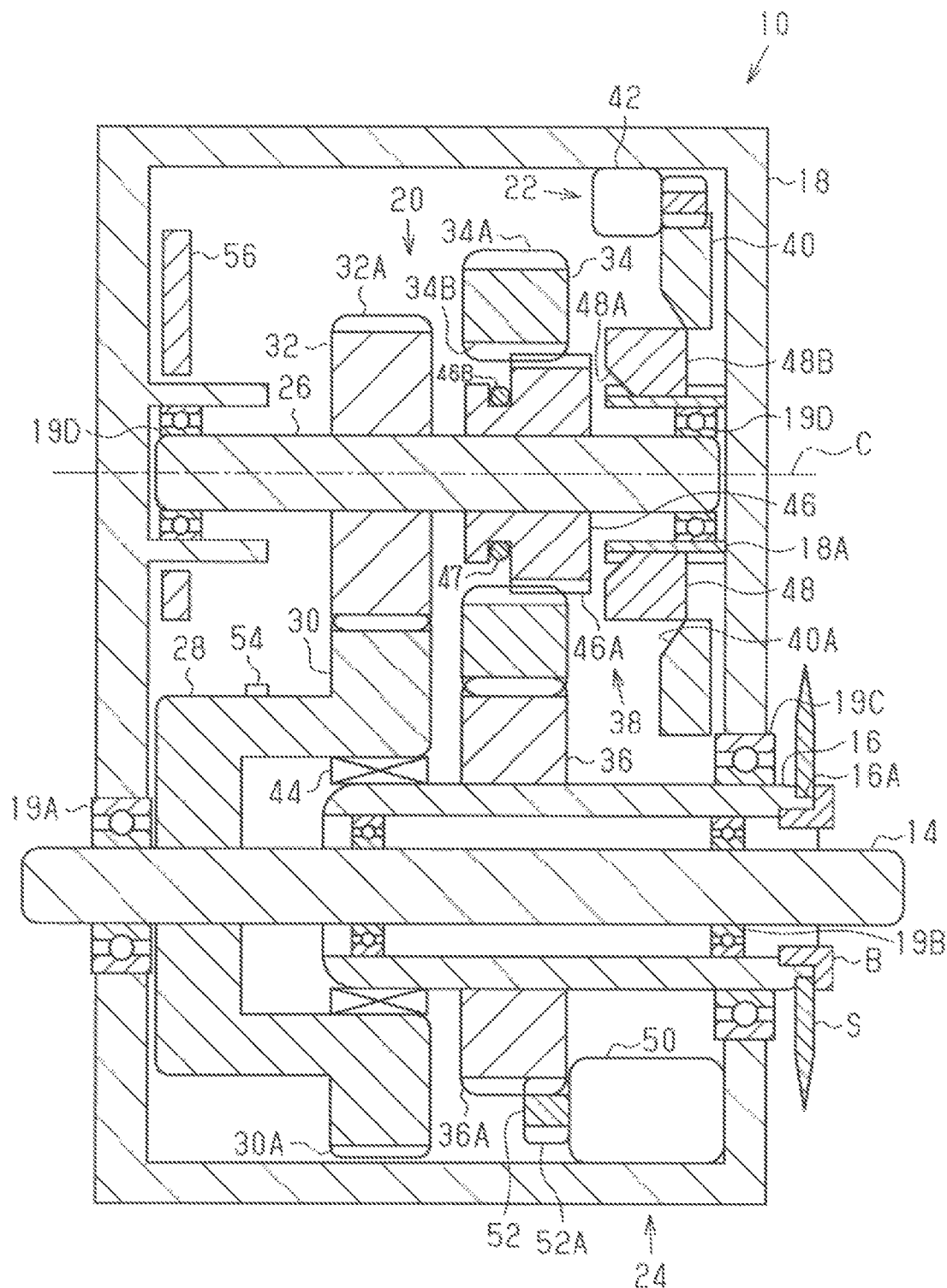
FIG. 8 is a cross-sectional view of the transmission device in accordance with a fourth modification of the first embodiment.

The transmission body 28 and the first rotating body 30 of the first embodiment can be integrally formed, as shown in FIG. 8.

In the transmission mechanisms 20, 60 of the first and the second embodiments, the speed can be increased between the third rotating body 34 and the fourth rotating body 36. In this case, in the second embodiment, the speed can be increased between the fifth rotating body 64 and the sixth rotating body 66 at a speed increase ratio that is different from that of the third rotating body 34 and the fourth rotating body 36 and at a speed increase ratio that is smaller than the speed increase ratio of the third rotating body 34 and the fourth rotating body 36.

Figure 9:
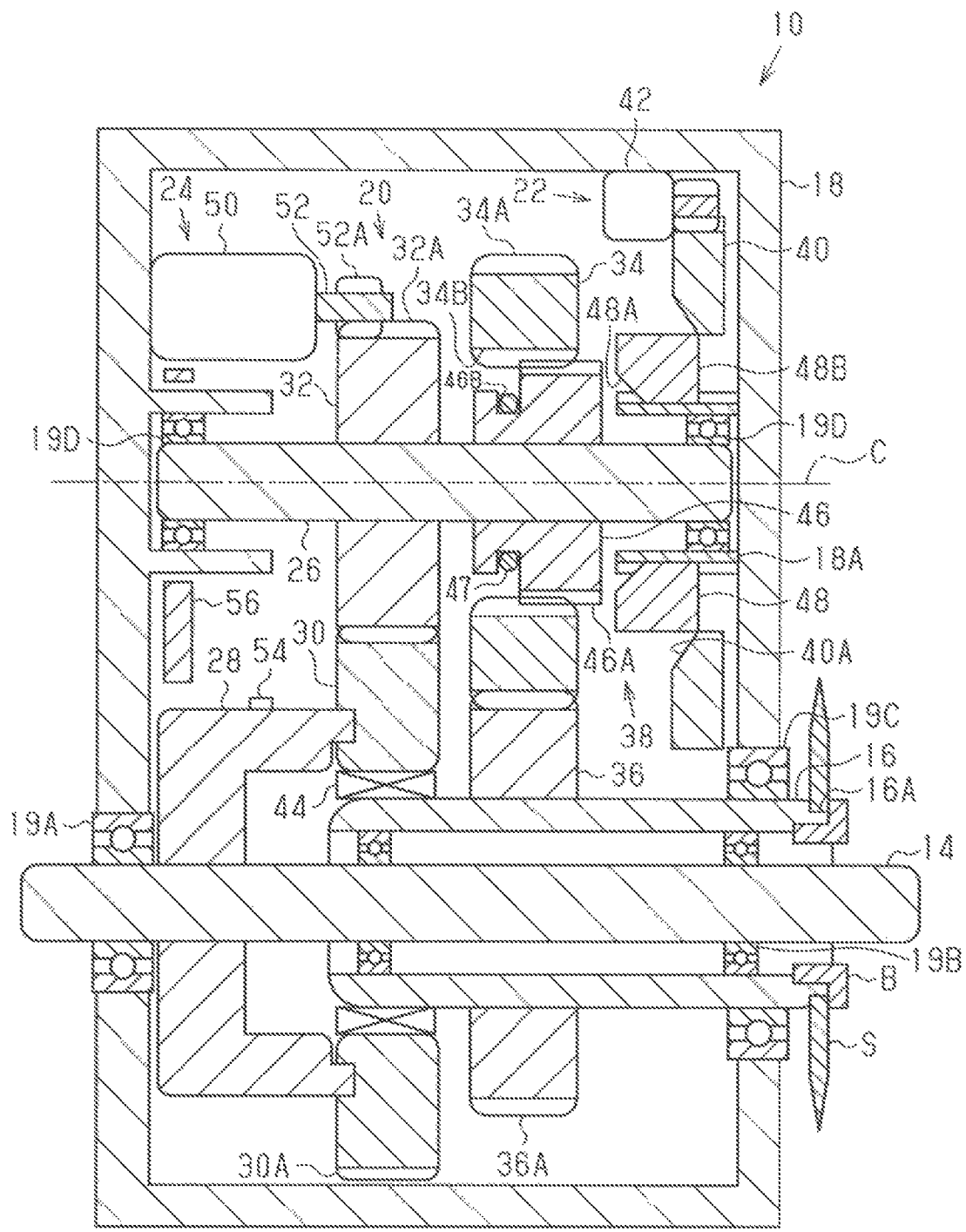
FIG. 9 is a cross-sectional view of the transmission device in accordance with a fifth modification of the first embodiment.

The assist motor 50 of the first to the third embodiments can be coupled to the second rotating body 32, 76. In particular, as shown in FIG. 9, the gear teeth 52A of the output shaft 52 of the assist motor 50 meshes with the gear teeth 32A of the second rotating body 32. The torque of the assist motor 50 is added to the torque of the transmission shaft 26. For this reason, when the tapered surface 48A of the control member 48 and the pawls 46A come in contact, the force to which the torque of the assist motor 50 is added is converted into a force with which the pawls 46A are pressed down by the transmission shaft 26 along the tapered surface 48A, allowing for easier shifting.

The one-way clutches 44, 68, 86 of the first to the third embodiments may be a one-way clutch that is provided with a ratchet mechanism.

A one-way clutch that prevents the reverse rotation of the output part 16 may be provided to the transmission device 10 of the first to the third embodiments. The one-way clutch is, for example, provided between the input rotational shaft 14 and the transmission body 28.

A decelerating mechanism can be provided between the assist motor 50 and the third rotating body 34, 78 of the first to the third embodiments.

The assist mechanism 24 of the first to the third embodiment can also be omitted.

The transmission device 10 of the first to the third embodiments can be provided radially outside of the crankshaft. In this case, a transmission mechanism for inputting the rotation of the crankshaft to the input rotational shaft is provided.

The actuator 42 of the first to the third embodiments can be omitted. In this case, the operating device that is attached to the bicycle and the switching mechanisms 22, 62, 72 are connected by a wire, and the shift cam 40 is operated via operation of the wire.

In the transmission device 10 of each embodiment described above, the first rotating body and the second rotating body are coupled by gears, the third rotating body and the fourth rotating body are coupled by gears, and the fifth rotating body and the sixth rotating body are coupled by gears. However, the following modifications can be made. That is, the transmission device 10 can be configured so that the first to the sixth rotating bodies are formed by a sprocket or a pulley and so that, between the first rotating body and the second rotating body, between the third rotating body and the fourth rotating body, and between the fifth rotating body and the sixth rotating body, there is a connection via an annular body, such as a chain or a belt.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle transmission device comprising:
    an input rotational shaft;
    an output part;
    a transmission mechanism including a first rotating body configured to transmit rotation of the input rotational shaft and a fourth rotating body configured to transmit the rotation of the input rotational shaft, the fourth rotating body being different from the first rotating body; and
    a switching mechanism configured to selectively switch between a first state in which a ratio of a rotational speed of the output part to a rotational speed of the input rotational shaft is a first ratio and a second state in which the ratio is a second ratio that is different from the first ratio,
    a switching mechanism including:
        a one-way clutch configured to switch between a third state in which rotation is not transmitted from the first rotating body to the output part, and a fourth state in which rotation is transmitted from the first rotating body to the output part; and
        a switching unit configured to switch between a fifth state in which rotation is transmitted from the fourth rotating body to the output part, and a sixth state in which rotation is not transmitted from the fourth rotating body to the output part,
    the first state including the third state and the fifth state,
    the second state including the fourth state and the sixth state.

2. The bicycle transmission device according to claim 1, wherein
    the one-way clutch is configured to permit relative rotation between the first rotating body and the output part so as to be in the third state when the rotational speed of the input rotational shaft in one direction is less than a rotational speed of the output part in one direction, and
    the one-way clutch is configured to integrally rotate the first rotating body and the output part together so as to be in the fourth state when the rotational speed of the input rotation shaft in the one direction is greater than or equal to the rotational speed of the output part in the one direction.

3. The bicycle transmission device according to claim 1, wherein
    the one-way clutch is provided between the first rotating body and the output part with respect to a radial direction of the input rotational shaft.

4. The bicycle transmission device according to claim 1, wherein
    the one-way clutch is configured such that a radial distance between the input rotational shaft in the radial direction of the input rotational shaft is shorter than a radial distance between the switching unit and the input rotational shaft in the radial direction of the input rotational shaft.

5. The bicycle transmission device according to claim 1, wherein
    the transmission mechanism further comprises a transmission body that is configured to transmit the rotation of the input rotational shaft to the first rotating body, and
    the one-way clutch is provided between the transmission body and the fourth rotating body in a direction along a center axis of the input rotational shaft.

6. The bicycle transmission device according to claim 5, further comprising
    a torque sensor provided on the transmission body.

7. The bicycle transmission device according to claim 1, wherein
    the output part has a first end portion provided with an attaching portion that is configured to be attached with a sprocket and a second end portion that is spaced from the first end portion in a direction along a center axis of the input rotational shaft,
    the one-way clutch is provided at the second end portion.

8. The bicycle transmission device according to claim 1, wherein
    the first rotating body is configured to rotate around a center axis of the input rotational shaft,
    the fourth rotating body is configured to rotate around a center axis of the output part.

9. The bicycle transmission device according to claim 1, wherein
    the first rotating body includes a first gear,
    the fourth rotating body includes a fourth gear, and
    the fourth gear has a total number of teeth that is fewer than a total number of teeth of the first gear.

10. The bicycle transmission device according to claim 1, wherein
    the switching unit is configured to be at least partially disposed between the fourth rotating body and the output part.

11. The bicycle transmission device according to claim 1, wherein
    the transmission mechanism further comprises a transmission shaft configured to transmit the rotation of the first rotating body to the fourth rotating body.

12. The bicycle transmission device according to claim 11, wherein
    the transmission mechanism further comprising a second rotating body provided between the transmission shaft and the first rotating body and a third rotating body provided between the transmission shaft and the forth rotating body, the second rotating body is configured to rotate around a center axis of the transmission shaft, and the third rotating body is configured to rotate around a center axis of the transmission shaft.

13. The bicycle transmission device according to claim 11, further comprising an assist motor operatively coupled to the transmission mechanism such that the transmission mechanism transmits torque of the motor to the output part via the transmission shaft.

14. The bicycle transmission device according to claim 13, wherein the transmission mechanism is configured to transmit the torque of the assist motor to the output part via the transmission shaft and the fourth rotating body while in the first state, and the transmission mechanism is configured to transmit the torque of the assist motor to the output part via the first rotating body while in the second state.

15. The bicycle transmission device according to claim 1, wherein the first ratio is greater than the second ratio.

* * * * *